(12) United States Patent
Priborsky et al.

(10) Patent No.: US 9,753,887 B2
(45) Date of Patent: Sep. 5, 2017

(54) RECEIVER TRAINING DURING A SATA OUT OF BAND SEQUENCE

(75) Inventors: Anthony Leigh Priborsky, Lyons, CO (US); Marc Stephen Hildebrant, Longmont, CO (US)

(73) Assignee: SEAGATE TECHNOLOGY LLC, Scotts Valley, CA (US)

( * ) Notice: Subject to any disclaimer, the term of this patent is extended or adjusted under 35 U.S.C. 154(b) by 2154 days.

(21) Appl. No.: 12/391,727

(22) Filed: Feb. 24, 2009

(65) Prior Publication Data
US 2010/0217898 A1    Aug. 26, 2010

(51) Int. Cl.
*G06F 13/42* (2006.01)
*H04L 25/02* (2006.01)

(52) U.S. Cl.
CPC .. *G06F 13/4295* (2013.01); *G06F 2213/0032* (2013.01); *H04L 25/028* (2013.01); *H04L 25/0292* (2013.01)

(58) Field of Classification Search
None
See application file for complete search history.

(56) References Cited

U.S. PATENT DOCUMENTS

| | | | |
|---|---|---|---|
| 6,088,741 A * | 7/2000 | Murata | 710/20 |
| 6,618,383 B1 * | 9/2003 | Tomlins | 370/395.5 |
| 7,039,064 B1 | 5/2006 | Paulson | |
| 7,280,302 B1 | 10/2007 | Masiewicz | |
| 7,319,705 B1 | 1/2008 | Wu | |
| 7,774,424 B1 * | 8/2010 | Bailey et al. | 709/211 |
| 7,809,942 B2 * | 10/2010 | Baran et al. | 713/160 |
| 7,814,245 B2 * | 10/2010 | Schauer | 710/62 |
| 8,127,059 B1 * | 2/2012 | Carr et al. | 710/74 |
| 2003/0115413 A1 * | 6/2003 | Wood et al. | 711/114 |
| 2004/0103333 A1 * | 5/2004 | Martwick et al. | 713/400 |
| 2004/0120353 A1 * | 6/2004 | Kim et al. | 370/503 |
| 2004/0193737 A1 * | 9/2004 | Huffman et al. | 710/1 |

(Continued)

OTHER PUBLICATIONS

"An Overview of Serial ATA Technology"; Author: Chris Erickson, pp. 1-46. Public Access Date: Jul. 10$^{th}$, 2007. Indexer/Publisher: Department of Electrical and Computer Engineering.*

*Primary Examiner* — Henry Tsai
*Assistant Examiner* — Christopher Bartels
(74) *Attorney, Agent, or Firm* — Hall Estill Attorneys at Law

(57) ABSTRACT

A communications apparatus is provided having a first line driver transmitting data at a first end of a serial bus to a second line receiver at a second end of the serial bus. A first line receiver receives data at the first end of the serial bus from a second line driver at the second end of the serial bus. The first line receiver has a selectable input parameter that controls a physical layer quality of data received at the first end of the serial bus. Programming instructions stored in memory cause the second line driver to transmit a training signal that is not a COMWAKE signal to the first line receiver in response to the first line driver transmitting a COMWAKE signal to the second line receiver. A controller compares a received physical layer quality of the training signal at the first line receiver to a desired physical layer quality and computes a value for the input parameter to obtain a desired physical layer quality.

20 Claims, 9 Drawing Sheets

(56) References Cited

U.S. PATENT DOCUMENTS

| | | | |
|---|---|---|---|
| 2004/0268169 A1* | 12/2004 | Bashford et al. | 713/320 |
| 2005/0017756 A1 | 1/2005 | Priborsky | |
| 2005/0169356 A1* | 8/2005 | Matsumoto | G06F 1/3203 |
| | | | 375/220 |
| 2005/0186832 A1* | 8/2005 | Nemazie | 439/378 |
| 2005/0216800 A1 | 9/2005 | Bicknell | |
| 2005/0254610 A1 | 11/2005 | Liu | |
| 2005/0268199 A1 | 12/2005 | Tseng | |
| 2006/0026315 A1* | 2/2006 | Hong et al. | 710/60 |
| 2006/0039406 A1* | 2/2006 | Day et al. | 370/469 |
| 2006/0129733 A1* | 6/2006 | Sobelman | 710/305 |
| 2006/0277331 A1* | 12/2006 | Priborsky et al. | 710/60 |
| 2007/0011536 A1 | 1/2007 | Khanna | |
| 2007/0067551 A1* | 3/2007 | Ikeda et al. | 710/315 |
| 2007/0083707 A1* | 4/2007 | Holland et al. | 711/114 |
| 2007/0223517 A1* | 9/2007 | Warren | G06F 3/0607 |
| | | | 370/463 |
| 2008/0034137 A1 | 2/2008 | Whitby-Strevens | |
| 2008/0056424 A1* | 3/2008 | Chang | H04L 7/0083 |
| | | | 375/371 |
| 2008/0074992 A1 | 3/2008 | Sams | |
| 2008/0086576 A1* | 4/2008 | Schauer | 710/5 |
| 2008/0189641 A1* | 8/2008 | Kotturu | H04L 43/18 |
| | | | 715/771 |
| 2009/0083587 A1* | 3/2009 | Ng et al. | 714/47 |

\* cited by examiner

RECEIVER TRAINING DURING A SATA OUT OF BAND SEQUENCE

FIELD

The present embodiments relate to serial communications and more particularly but without limitation to controlling a transceiver in a serial link to perform with a desired physical layer quality during communication between devices connected via the serial link.

BACKGROUND

Serial interfaces such as the Serial Advanced Technology Attachment (SATA) interface are used to connect data storage devices to a host device or host adapter. The data transfer rate of first-generation SATA (SATA-I) is 1.5 Gbps. Second and third generations cumulatively double that speed to 3 Gbps and 6 Gbps, respectively. SATA permits a first device to transmit data to a second device by serially transmitting a plurality of bits ("bitstream") that is encoded such that a clock can be recovered from the received data bitstream.

The serial link is physically formed by a bust made up of transceivers at both ends of a transmission line and joined together by various connectors. The transmission line, such as but not limited to copper wires or traces, can have inherent electrical discontinuities and can form electrical discontinuities with the connectors. Furthermore, there can be an impedance mismatch between the transmission line and the transceivers. The electrical and mechanical characteristics of the transmission line between the transmitter and receiver can distort the signal at the receiver causing reduced data transfer rates and data transfer errors.

The claimed embodiments are directed to solutions for these problems.

SUMMARY OF THE INVENTION

The present embodiments are generally directed to serial communications.

In some embodiments a method is provided that includes a first device transmitting a COMWAKE signal to a second device via a serial bus. In response to the first device transmitting the COMWAKE signal, the second device transmits a training signal that is not a COMWAKE signal to the first device via the serial bus. After transmitting the training signal, the method further includes setting a first parameter value based on a characterization of the training signal to obtain a desired physical layer quality between the first and second devices. Finally, after setting the first parameter value, the method further includes transmitting a second training signal that is not a COMWAKE signal to the second device via the serial bus before the second device transmits a COMWAKE signal to the first device.

In some embodiments a method is provided that includes a first device transmitting a COMWAKE signal to a second device via a serial bus. In response to receiving the COMWAKE signal, the second device transmits a first training signal to the first device via the serial bus. The method further includes setting a first receiver parameter to a value based on a characteristic of the first training signal to obtain a desired physical layer quality between the first and second devices before the second device transmits a COMWAKE signal to the first device.

In some embodiments a communications apparatus is provided having a first line driver transmitting data at a first end of a serial bus to a second line receiver at a second end of the serial bus. A first line receiver receives data at the first end of the serial bus from a second line driver at the second end of the serial bus. The first line receiver has a selectable input parameter that controls a physical layer quality of data received at the first end of the serial bus. Programming instructions stored in memory cause the second line driver to transmit a training signal that is not a COMWAKE signal to the first line receiver in response to the first line driver transmitting a COMWAKE signal to the second line receiver. A controller compares a received physical layer quality of the training signal at the first line receiver to a desired physical layer quality and computes a value for the input parameter to obtain a desired physical layer quality.

DETAILED DESCRIPTION

Figure 1:
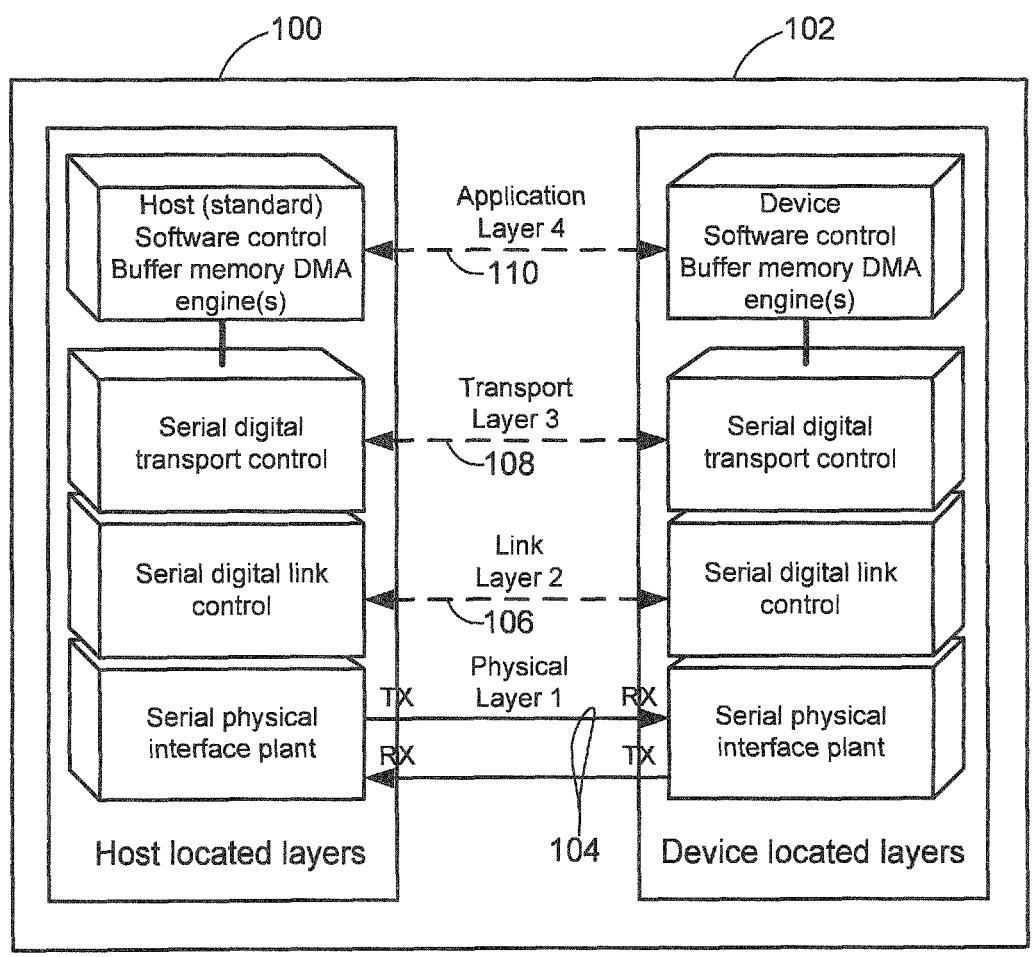
FIG. 1 diagrammatically depicts communication layers in a SATA interface.

FIG. 1 diagrammatically depicts communication layers in a serial link as defined in the SATA specification for interconnecting a host device 100 to a storage device 102. The depicted communication layers are a physical layer 104, a link layer 106, a transport layer 108, and an application layer 110. The physical layer 104 performs conversions between digital and analog signals. That is, the physical layer 104 receives a digital signal from the link layer 106, converts the digital signal into an analog signal, and transmits the analog signal to the other device 100, 102. Conversely, the physical layer 104 also receives an analog signal from one of the devices 100, 102, converts the analog signal to a digital signal, and transmits the digital signal to the link layer 106.

The link layer 106 encodes and decodes the digital data. That is, the link layer 106 encodes digital data received from the transport layer 108 and transmits the encoded data to the physical layer 104. Conversely, the link layer 106 decodes digital data received from the physical layer 104 and transmits the decoded data to the transport layer 108. The transport layer 108 also constructs and deconstructs a frame information structure ("FIS") for the data according to a format defined in the SATA specification. The application layer 110 generally controls buffer memory and direct memory access ("DMA") engines.

During the serializing process the sending device 100, 102 transmits the data in a serialized bitstream. In addition to user data, the bitstream also includes control codes ("primitives") for controlling steps of the transmission and controlling power management of the sending and receiving devices 100, 102. For example, an X_RDY ("transmission ready") primitive signals that the sending device 100, 102 is ready to send data, and a R_RDY ("receiver ready") primitive signals that the receiving device 100, 102 is ready to receive data.

Figure 2:
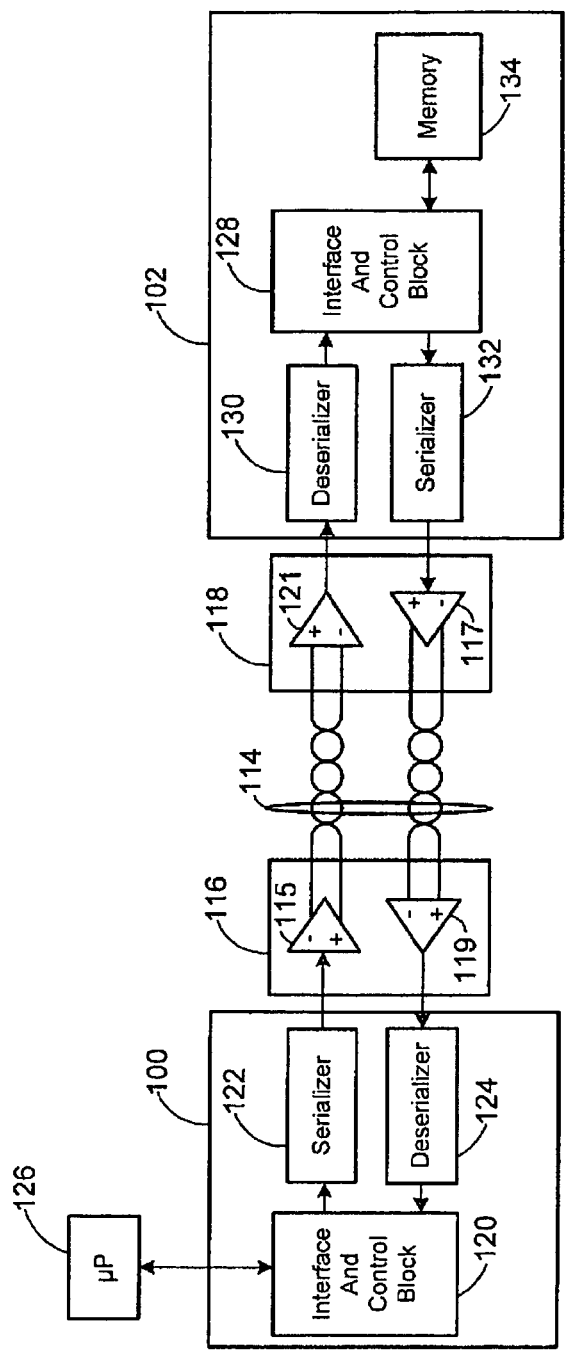
FIG. 2 depicts a functional block diagram of a host device connected to a storage device via a SATA interface.

FIG. 2 depicts a functional block diagram of illustrative embodiments of the host device 100, the storage device 102, and a SATA interface 112 interconnecting the host device 100 and the storage device 102. As depicted in FIG. 2, the SATA interface 112 can have a serial bus 114 with a physical interface 116 connected to the host device 100 at one end of the serial bus 114 and another physical interface 118 connected to the storage device 102 at the opposing end of the serial bus 114. Each of the physical interfaces 116, 118 has a differential transmitter 115, 117 and a differential receiver 119, 121. In equivalent alternative embodiments one or both of the physical interfaces 116, 118 can be included as part of the respective devices 100, 102. Further, although the embodiments of FIG. 2 depict the serial bus 114 as being constructed of a twisted pair of wires, in alternative equivalent embodiments other constructions can be employed such as with traces on a printed circuit board and backplane connectors.

The host device 100 includes an interface and control block 120 communicating with a serializer 122 and a deserializer 124. The interface and control block 120 receives data and commands from a microprocessor 126. In the depicted embodiments the microprocessor 126 communicates remotely with the interface and control block 120, but in alternative equivalent embodiments the microprocessor 126 can be included in the host device 100. The communication associated with a host 100 command is serialized and transmitted via the SATA interface 112 to the storage device 102.

Like the host device 100, the storage device 102 also includes an interface and control block 128 in communication with a deserializer 130 and a serializer 132. The interface and control block 128 also stores data to and retrieves data from a memory 134. When the aforementioned host 100 command is to retrieve data from the memory 134, that data is serialized and transmitted via the SATA interface 112 to the host device 100.

Figure 3:
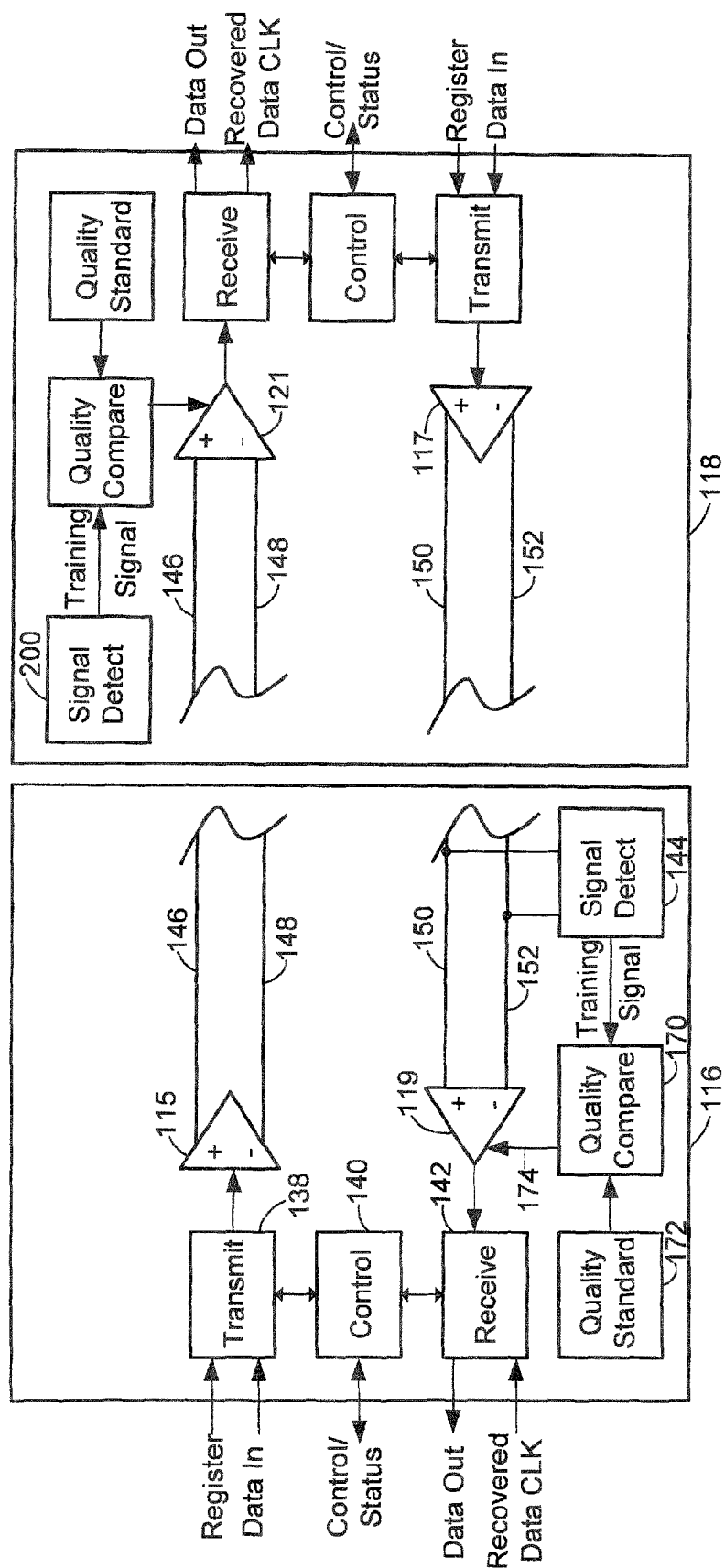
FIG. 3 depicts a more detailed portion of the functional block diagram of FIG. 2.

FIG. 3 depicts a functional block diagram showing additional details of the physical interfaces 116, 118 in accordance with embodiments of the present invention. The physical interface 116 includes a transmit block 138, a control block 140, and a receive block 142. A register interface and an input data port both input data to the transmit block 138. Control and status signals are communicated with the control block 140. Output data and a recovered data clock signal are both outputs of the receive block 142.

Analog portions of the physical interface 116 include the differential transmitter 115, the differential receiver 119, and a signal detector 144. That is, the differential transmitter 115 preferably includes a digital-to-analog interface, and similarly the differential receiver 119 preferably includes an analog-to-digital interface. To transmit data, the physical interface 116 receives data from the data in port, encodes and serializes the data in the transmit block 138, and transmits the encoded data serially through the differential transmitter 115 over lines 146, 148. Similarly, the differential receiver 119 receives differential data sent over lines 150, 152, deserializes and decodes the data in the receive block 142, and transmits the data at the data out port.

Figure 4:
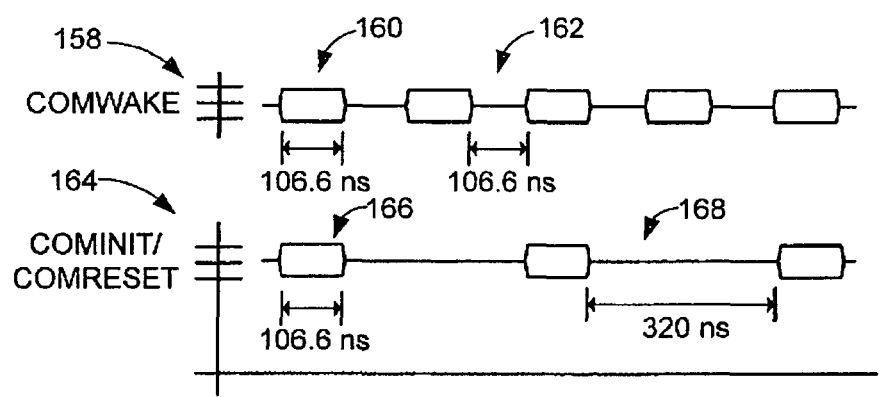
FIG. 4 graphically depicts the pulse sequences of COMWAKE, COMINIT, and COMRESET out of band signals.

The signal detector 144 signals the presence of any incoming signal, and discriminates a training signal 154 as opposed to any out-of-band ("OOB") signal such as a COMWAKE signal, a COMRESET signal, or a COMINIT signal. FIG. 4 shows the relative timing between the bursts and gaps for those OOB signals. Waveform 158 represents a COMWAKE signal. Each burst 160 in the COMWAKE signal has a nominal duration of 106.6 nanoseconds (ns), and each gap 162 between adjacent bursts 160 also has a nominal duration of 106.6 ns. Waveform 164 represents either a COMRESET signal or a COMINIT signal, depending on whether the host device 100 or the storage device 102 transmitted the signal, respectively. For example, when the host device 100 transmits the COMRESET signal the storage device 102 normally responds with the COMINIT signal. Bursts 166 in the COMRESET or COMINIT signal have a nominal duration of 106.6 ns, and gaps 168 between adjacent bursts 166 have a nominal duration of 320 ns.

Returning to FIG. 3, differential data received from lines 150, 152 is filtered and analyzed to detect whether an incoming signal is an OOB signal. The present embodiments under certain circumstances assume that an incoming signal that is not an OOB signal is rather a training signal 154. A physical layer quality block 170 compares a physical layer quality of the incoming training signal 154 to a desired physical layer quality provided by a quality standard 172. Based on the results of the comparison, the physical layer quality compare block 170 provides an input parameter value 174 to the differential receiver 119 to modify the received signal so as to provide the desired physical layer quality between the host device 100 and the storage device 102.

Figure 5:
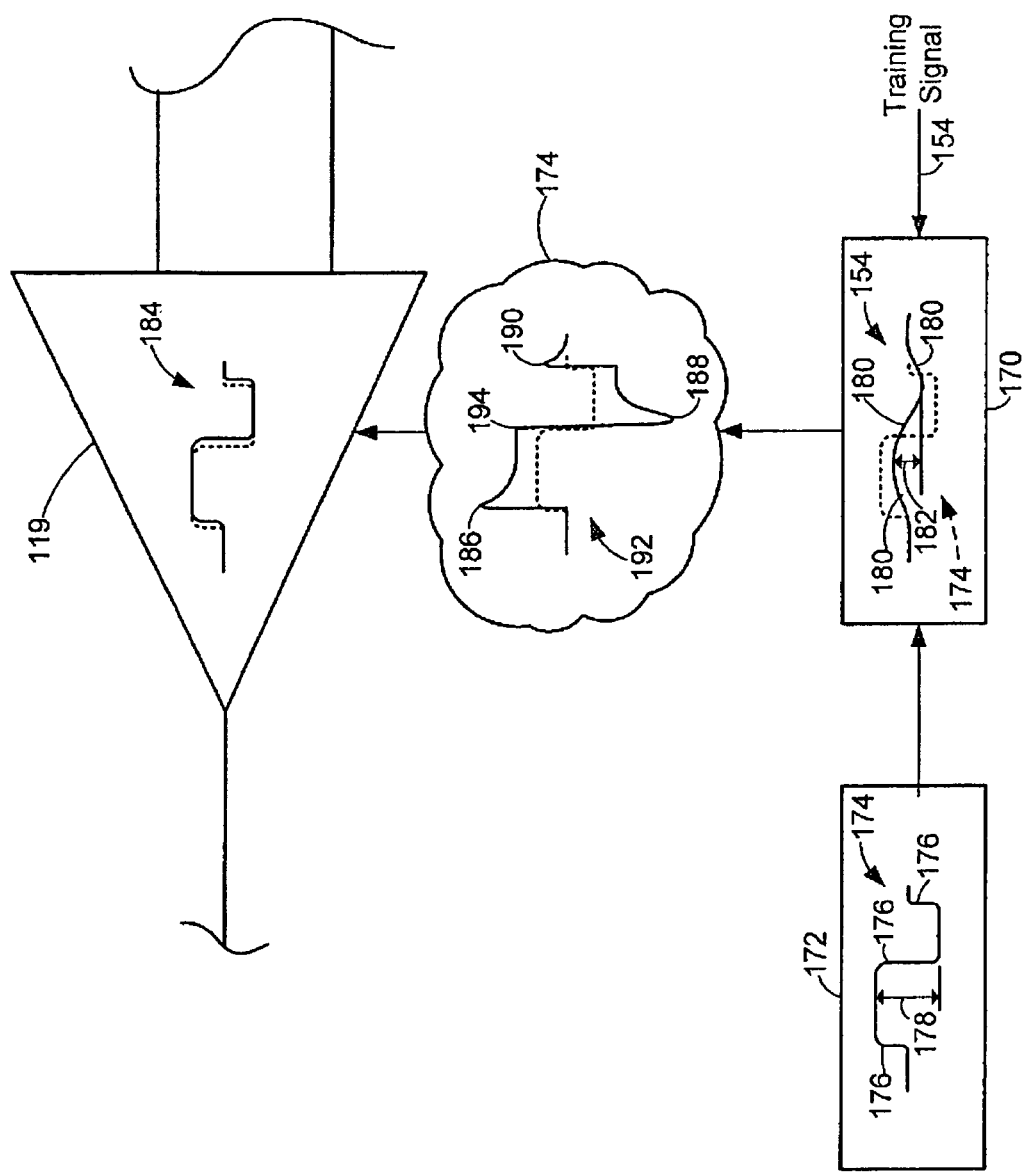
FIG. 5 diagrammatically depicts a receiver training sequence in accordance with the present embodiments.

FIG. 5 diagrammatically depicts the comparison of received and desired physical layer qualities of the training signal 154. The physical layer quality compare block 170 depicts overlaying a waveform 154 representative of the received training signal 154 on a waveform 174 representative of the desired physical layer quality. The waveform 174 is a pulse stream with well-defined edges 176 and a nominal amplitude 178 that provides good noise margins in the context of the logic levels of the physical layer of the channel communication protocol. However, the waveform 154 as received is distorted, having comparatively poorly defined edges 180 and a low amplitude 182. As discussed above, the distortion can be attributable to a number of physical layer anomalies such as electrical discontinuities, excessive capacitive loading from the serial bus 114, and connectors.

The physical layer quality compare block 170 sets one or more input parameter values 174 to the differential receiver 119 reduce the distortion and thereby obtain the desired physical layer quality as depicted by waveform 184. For example, in some embodiments the input parameter value 174 can be a frequency rolloff ("dB") value associated with pre-emphasis 186, 188, 190 in the conditioned waveform 192 from that of the training signal 154 in terms of the input parameter values 174 to obtain the waveform 184 with its comparatively sharp, well defined edges. Another input parameter value 174 can be a gain value associated with increasing the amplitude 194 of the waveform 192 in order to compensate for the distorted amplitude in the training signal 154 and obtain the desired amplitude in the waveform 184.

The foregoing description of the manner in which the differential receiver 119 is trained to provide the desired physical layer quality is likewise applicable to the same structure depicted for the training signals received by the other differential receiver 121.

Figure 6:
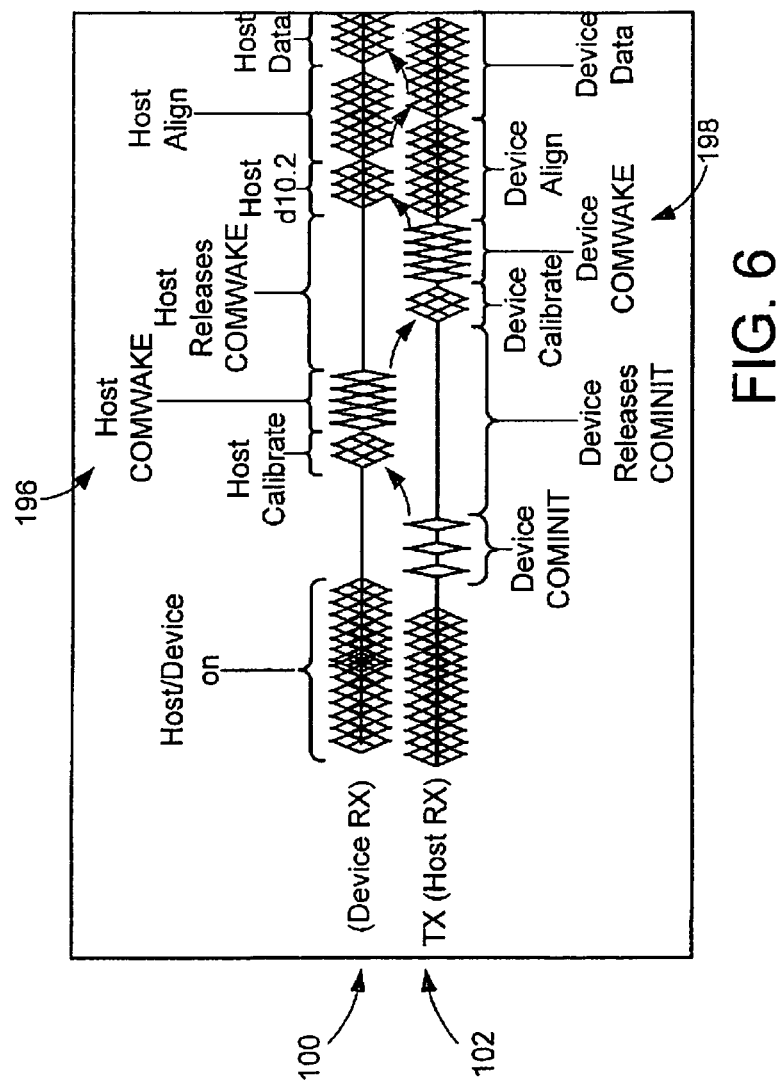
FIG. 6 depicts the interval in a SATA out of band sequence during which the training sequence occurs in accordance with the present embodiments.

FIG. 6 diagrammatically depicts an out-of-band sequence between the host device 100 and the storage device 102. The training of the differential receivers 119, 121 occurs in the interval defined as after the host device 100 transmits a COMWAKE signal at 196 and before the storage device 102 responds by transmitting a COMWAKE signal at 198.

Figure 7:
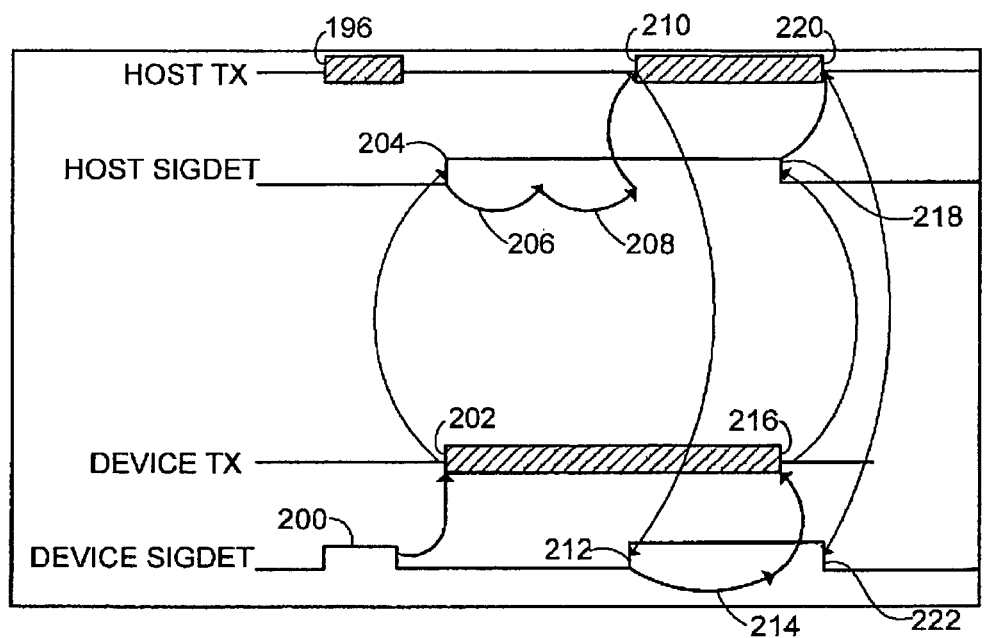
FIG. 7 depicts the sequence of signals between the host device and the storage device during the training sequence in accordance with the present embodiments.

FIG. 7 is a diagrammatic representation of the timing sequences that occur during that interval to train the differential receivers 119, 121 (FIG. 3). The diagram depicts transmission bursts from the host device 100 and the storage device 102 and indications of incoming signals at the respective signal detect blocks 144, 200 (FIG. 3). The process begins with the host device 100 transmitting a COMWAKE signal to the storage device 102 at 196, also shown in the out of band sequence in FIG. 6. The storage device signal detect block 200 determines that a COMWAKE signal has been received at 202, and in response the storage device 102 transmits a training signal 154 to the host device 100 beginning at 202. Preferably, the storage device 102 has programming instructions stored in memory, such as memory 134, that invokes this response to receiving a COMWAKE signal.

The host device signal detect block 144 begins sensing the transmitted signal at 204, and continuously monitors the incoming signal for an interval 206 that disqualifies the signal as a COMWAKE signal. The host device 100 therefore performs a training sequence during interval 208 as described above to set input parameters 174 to the differential receiver 119 in order to obtain the desired physical level quality in signals transmitted to the host device 100.

When the host device 100 training sequence is completed it begins at 210 to transmit a training signal 154 to the storage device 102. Preferably, the host device 100 responds to programming instructions stored in memory that recognize the interlocked training sequence of the present embodiments has been initiated by the storage device 102 sending the first training signal, and thus invoke the host device 100 sending the second training signal. The storage device signal detect 200 senses the incoming signal beginning at 212 and performs a training sequence on the differential receiver 121 during interval 214. When the storage device 102 training sequence is complete it stops transmitting its training signal at 216. The host device signal detect 144 is thereby deasserted at 218, after-which the host device 100 stops transmitting its training signal at 220. The storage device signal detect is thereby deasserted at 222, signaling the end of the training sequence of the present embodiments.

Figure 8:
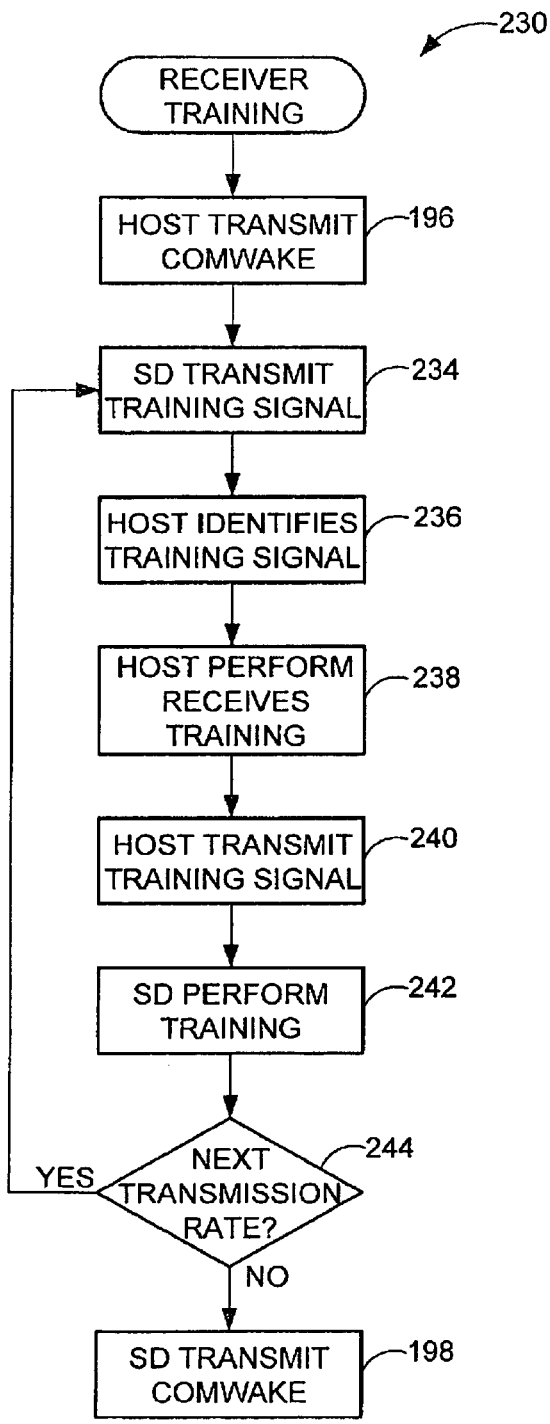
FIGS. 8 and 9 are flowcharts depicting steps in a method for RECEIVER TRAINING in accordance with the present embodiments.

FIG. 8 is a flowchart for a RECEIVER TRAINING method 230 that includes the steps of the sequence in FIG. 7. The method 230 begins with the host device 100 transmitting the COMWAKE signal in block 196, also depicted in the out of band sequence of FIG. 6. In response, the storage device (SD) 102 responds via the programming instructions stored in memory (such as 134) by transmitting a training signal to the host device 100 in block 234. The host device 100 identifies the transmitted signal as being a training signal in block 236, and uses the training signal to perform training on the differential receiver 119 in block 238. When the host device 100 has completed its receiver training, it then transmits a training signal to the storage device in block 240. The storage device uses the transmitted training signal to perform training on the differential receiver 200 in block 242.

In block 244 it is determined whether another bit transmission rate is supported by the SATA interface. If another rate is supported, then control returns to block 234 where the storage device 102 transmits another training signal 154 to the host device 100 at the new bit transmission rate. If the determination of block 244 is no, then control passes to block 198 where the storage device 102 transmits a COMWAKE signal to the host device 100, as also depicted in the out-of-band sequence in FIG. 6.

Figure 9:
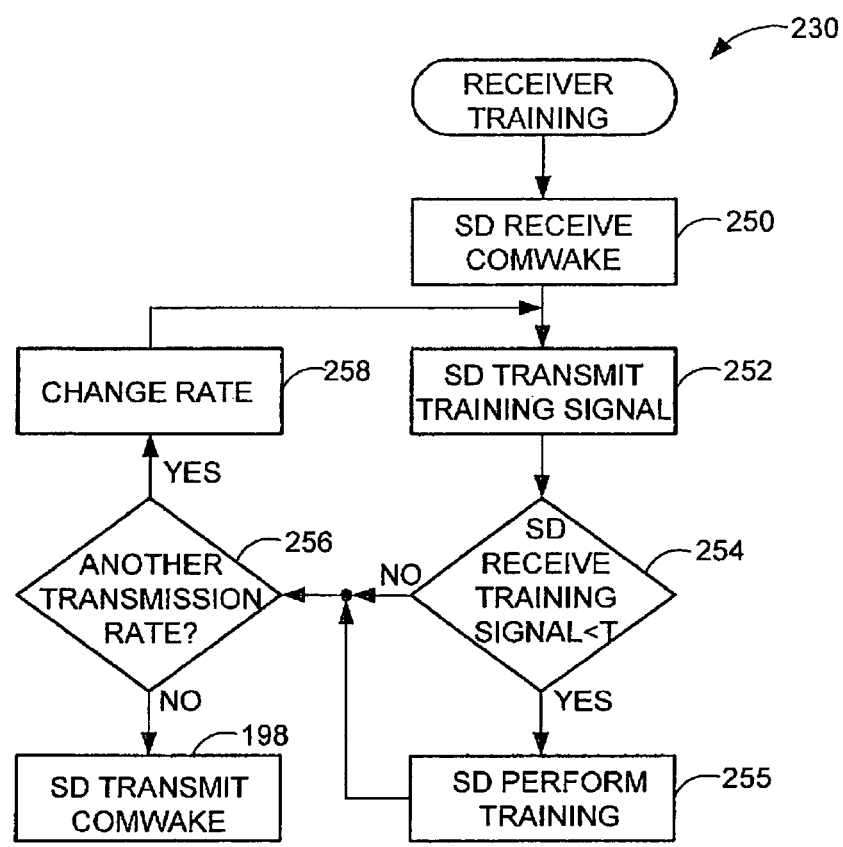

FIG. 9 is a flowchart depicting steps of the method 230 solely from the vantage point of the storage device 102. The method 230 begins in block 250 with the storage device 102 receiving a COMWAKE signal. In response, the storage device 102 transmits a training signal in block 252. In block 254 it is determined whether the storage device 102 receives a training signal from the host device 100 within a predetermined interval, "T." If the determination of block 244 is no, then the governing assumption is that the host device 100 does not support communications at that bit transmission rate. In block 256 it is determined whether another bit transmission rate is supported by the SATA interface. If the determination of block 256 is yes, then the bit transmission rate is changed in block 258 and control returns to block 252 at the new rate. Otherwise, if the determination of block 256 is no then the storage device 102 proceeds to block 198 and transmits a COMWAKE signal in accordance with the out-of-band sequence of FIG. 6.

If, however, the determination of block 254 is yes, then the storage device 102 performs its receiver training in block 255 and then control passes to the determination of block 256.

The foregoing describes the interlocked relationship between the host device 100 and the storage device 102 in performing the receiver training on both ends of the SATA interface. "Interlocked" as described above means that the host device 100 first initiates the training sequence by transmitting a COMWAKE signal, and the storage device 102 then responds by transmitting the first training signal. When the host device 100 completes its receiver training, it then transmits a second training signal for the storage device 102 to use in its receiver training. In other words, the training sequence of the described embodiments occurs during the "device calibrate" interval of the out of band sequence in FIG. 6, after the host COMWAKE signal but before the device COMWAKE signal.

However, the "interlocked" relationship of the present embodiments is not so limited to the host device 100 initiating the training sequence. For example, in alternative equivalent embodiments the skilled artisan recognizes without the need for enumeration that the training sequence could be initiated during the host calibrate interval of the SATA out of band sequence in FIG. 6. Such embodiments would be triggered by the host device 100 transmitting the first training signal in response to the storage device 102 transmitting a COMINIT out of band signal, then the storage device 102 transmitting a second training signal to the host device 100, all before the host device 100 transmits the COMWAKE out of band signal. Thus, the interlocked relationship is also bidirectional in the scope of the contemplated embodiments.

The present embodiments therefore include unexpected and novel advantages as detailed herein and as can be further appreciated from the claims, figures, and description by those skilled in the art. Although some of the embodiments are described in reference to a data storage system, or even to a data storage device, the skilled artisan recognizes without enumeration that the claimed invention has various other embodiments with application to other data transmission technologies.

It is to be understood that even though numerous characteristics and advantages of various illustrative embodiments of the invention have been set forth in the foregoing description, together with details of the structure and function of various embodiments of the invention, this disclosure is illustrative only, and changes may be made in detail, especially in matters of structure and arrangement of parts within the principles of the present embodiments, to the full extent indicated by the broad, general meaning of the terms in which the appended claims are expressed. It will be appreciated by those skilled in the art that the teachings of the present embodiments can be applied to a family of systems, devices, and means encompassed by and equivalent to the examples of embodiments described, without departing from the scope and spirit of the claimed embodiments. Further, still other applications for various embodiments, including embodiments pertaining to solid state data storage systems, are included within the claimed embodiments.

What is claimed:

1. A method comprising:
   a first device transmitting a COMWAKE signal to a second device via a serial bus;
   in response to the first device transmitting the COMWAKE signal, the second device transmitting a training signal that is not a COMWAKE signal to the first device via the serial bus;
   after transmitting the training signal, setting a first parameter value based on a characterization of the training signal to obtain a desired physical layer quality between the first and second devices; and
   after setting the first parameter value, transmitting a second training signal that is not a COMWAKE signal to the second device via the serial bus before the second device transmits a COMWAKE signal to the first device.

2. The method of claim 1 wherein the first parameter is a control input to a transceiver connecting the first device to a first end of the serial bus.

3. The method of claim 1 wherein the first parameter value is a dB value associated with a pre-emphasis physical layer quality.

4. The method of claim 1 wherein the first parameter value is a gain value associated with an amplitude physical layer quality.

5. The method of claim 1 further comprising after transmitting the second training signal, setting a second parameter value based on a characteristic of the second training signal to obtain the desired physical layer quality between the first and second devices before the second device transmits a COMWAKE signal to the first device.

6. The method of claim 5 further comprising the second device, if it does not receive the second training signal, transmitting a third training signal to the first device via the serial bus before the second device transmits a COMWAKE signal to the first device.

7. The method of claim 6 further characterized by the third training signal having a different bit transmission rate than the first training signal.

8. The method of claim 5 further comprising after setting the second parameter value, the second device aborting the first training signal and then transmitting a COMWAKE signal to the first device via the serial bus.

9. The method of claim 5 wherein the second parameter is a control input to a transceiver connecting the second device to a second end of the serial bus.

10. The method of claim 5 wherein the second parameter value is a dB value associated with a pre-emphasis physical layer quality.

11. The method of claim 5 wherein the second parameter value is a gain value associated with an amplitude physical layer quality.

12. A method comprising:
    a first device transmitting a COMWAKE signal via a serial bus;
    in response to the transmitting the COMWAKE signal, the first device receiving a first training signal via the serial bus; and
    setting a first receiver parameter to a value based on a characteristic of the first training signal to obtain a desired physical layer quality before the first device receives a COMWAKE signal via the serial bus.

13. The method of claim 12 wherein the first receiver parameter value is a dB value associated with a pre-emphasis physical layer quality.

14. The method of claim 12 wherein the first receiver parameter value is a gain value associated with an amplitude physical layer quality.

15. The method of claim 12 further comprising after setting the first receiver parameter value, transmitting a second training signal via the serial bus before the first device receives a COMWAKE signal via the serial bus.

16. The method of claim 15 further comprising after transmitting the second training signal, setting a second receiver parameter value based on information in the second training signal to obtain the desired physical layer quality before the first device transmits a COMWAKE signal via the serial bus.

17. The method of claim 16 further comprising in response to the transmitting the second training signal, receiving a third training signal via the serial bus before receiving a COMWAKE signal via the serial bus.

18. The method of claim 17 further characterized by the third training signal having a different bit transmission rate than the first training signal.

19. The method of claim 16 further comprising after setting the second receiver parameter value, aborting the first training signal and then receiving a COMWAKE signal via the serial bus.

20. A communications apparatus comprising:
    a first line driver transmitting data at a first end of a serial bus to a second line receiver at a second end of the serial bus;
    a first line receiver receiving data at the first end of the serial bus from a second line driver at the second end of the serial bus, the first line receiver having a selectable input parameter that controls a physical layer quality of data received at the first end of the serial bus;
    programming instructions stored in memory that causes the second line driver to transmit a training signal that is not a COMWAKE signal to the first line receiver in response to the first line driver transmitting a COMWAKE signal to the second line receiver; and
    a controller that compares a received physical layer quality of the training signal at the first line receiver to a desired physical layer quality and computes a value for the input parameter to obtain a desired physical layer quality.

* * * * *